United States Patent [19]

Kimura et al.

[11] Patent Number: 5,244,735
[45] Date of Patent: Sep. 14, 1993

[54] WATER-ABSORBENT RESIN AND PRODUCTION PROCESS

[75] Inventors: Kazumasa Kimura, Nara; Kinya Nagasuna, Hyogo; Takashi Namba, Osaka; Kenji Kadonaga, Hyogo; Koji Miyake; Tadao Shimomura, both of Osaka, all of Japan

[73] Assignee: Nippon Shokubai Kagaku Kabushiki Kaisha, Osaka, Japan

[21] Appl. No.: 989,722

[22] Filed: Dec. 11, 1992

Related U.S. Application Data

[60] Continuation of Ser. No. 694,607, May 2, 1991, abandoned, which is a division of Ser. No. 371,175, Jun. 26, 1989, Pat. No. 5,026,800.

[30] Foreign Application Priority Data

Jun. 28, 1988 [JP] Japan .................. 63-158086
Jul. 4, 1988 [JP] Japan .................. 63-164940
Oct. 13, 1988 [JP] Japan .................. 63-255866

[51] Int. Cl.$^5$ ........................................... C08F 120/06
[52] U.S. Cl. .................. 428/402; 526/317.1; 526/318.1
[58] Field of Search ............ 526/317.1, 318.1; 428/402

[56] References Cited

U.S. PATENT DOCUMENTS

| | | | |
|---|---|---|---|
| 4,682,274 | 7/1987 | Nakamura et al. | 526/216 |
| 4,732,968 | 3/1988 | Obayashi et al. | 528/499 |
| 4,734,478 | 3/1988 | Tsubakimoto et al. | 527/300 |
| 4,764,576 | 8/1988 | Ogawa et al. | 524/265 |
| 4,880,888 | 11/1989 | Obayashi et al. | 526/209 |

*Primary Examiner*—Joseph L. Schofer
*Assistant Examiner*—Tom Weber
*Attorney, Agent, or Firm*—Armstrong, Westerman, Hattori, McLeland & Naughton

[57] ABSTRACT

Water-absorbent resins having an average particle diameter of 100 to 600 μm and a particle diameter distribution of 0.35 or less are prepared by polymerizing an aqueous solution of a water-soluble ethylenically unsaturated monomer, pulverizing and sieving the gel-like polymer so obtained, and crosslinking the surface of the polymer powder. In an alternative process, an aqueous solution of the monomer having a viscosity greater than 15 cps is dispersed in a hydrophobic organic solvent and polymerized to obtain a polymer powder, and the surface of the polymer powder is crosslinked.

6 Claims, 2 Drawing Sheets

WATER-ABSORBENT RESIN AND PRODUCTION PROCESS

This application is a continuation of application Ser. No. 694,607 filed May 2, 1991 now abandoned, which is a division, of application Ser. No. 371,175 filed Jun. 26, 1989 now U.S. Pat. No. 5,026,800.

BACKGROUND OF THE INVENTION

This invention relates to a water-absorbent resin and a process for producing this resin. In detail, it relates to a water-absorbent resin having average particle diameter in a specially defined range, narrow range of particle distribution, and a surface of uniformly improved quality and, in particular, being superior in water absorption capacity, water absorption rate, suction force, and gel strength etc., showing that water absorption properties are in good balance, showing that an amount of elution of water-soluble resin (hereinafter referred to as water-soluble component) is only small, and being very suitable as sanitary materials, and also, a process for producing the water-absorbent resin. Furthermore, this invention relates to a water-absorbent resin of a new, novel type showing angle-lacking, non-sphere, being superior in handling and treating, and having a surface of uniformly improved quality, and a process for producing the water-absorbent resin.

Hitherto, an attempt has been carried out to use a water-absorbent resin as an absorbent sanitary material for absorbing body fluids such as a sanitary cotton, a disposable diaper, and the like. There have been known, as water-absorbent resins for this purpose, a hydrolyzed starch-acrylonitrile graft polymer (Japanese Official Patent Gazette, shouwa 49-43395), a neutralized starch-acrylic acid graft polymer (Japanese Official Patent Provisional Publication, shouwa 51-125468), a saponified vinyl acetate-acrylic acid ester copolymer (Japanese Official Patent Provisional Publication, shouwa 52-14689), a hydrolyzed acrylonitrile or acrylamide copolymer (Japanese Official Patent Gazette, Shouwa 53-15959), and crosslinked products of these polymers, a crosslinked product of a partially neutralized polyacrylic acid (Japanese Official Patent Provisional Publication, Shouwa 55-84304) and others.

Incidentally, as properties to be wanted for water-absorbent resins, are cited high water absorption capacity, a water absorption rate, and high gel strength of water-contained swelling gel when the resins are coming in contact with aqueous liquid, and superior suction force to suck up water from a basic material containing aqueous liquid. These properties hitherto have been in a poor balance. That is, these properties are not in directly proportional relation, in particular, water absorption capacity and water absorption rate or gel strength and suction force are in reversely proportional relation, so that there has been found a trend that, as the water absorption capacity increases, other properties decrease. When some resins of a high water-absorbent capacity come in contact with aqueous liquid, aqueous liquid does not spread over the whole part of a water-absorbent resin and the resins form lumps, that is, what we call fish-eyes, so that an extreme lowering of a water absorption rate is observed. Also, in a case of that these water-absorbent resins are used for an absorption body of sanitary materials, the above-described water-soluble component being contained in the water-absorbent resins affects on the absorption capacity of an absorption body, liquid-spreading in a absorption body, and so on. Especially, as the water-absorption capacity for a water-absorption resin increases, elution of a water-soluble component increases in amount, so that there has been found a problem that the resin can not properly used as sanitary materials.

As methods to improve the above-described properties with maintaining their good balance, there have been proposed methods to improve such properties as a water absorption rate etc. by crosslinking the surface of an obtained water-absorbent resin, without giving damage for water absorption capacity which the water-absorbent resin itself has. They are a method wherein a water-absorbent resin being dispersed in a hydrophilic organic solvent or a hydrophobic organic solvent in presence of water and undergoing to react in addition of a crosslinking agent (or its aqueous solution) (Japanese Official Patent Gazette, shouwa 61-48521 and 60-18690) and a method wherein a water-absorbent resin powder was mixed with a crosslinking agent or a liquid composition containing a crosslinking agent to treat with heat (Japanese Official Patent Provisional Publication, shouwa 58-180233, 59-189103, and 61-16903) and so on.

In these cases, of importance are uniform dispersion of a crosslinking agent over the surface of a water-absorbent resin and proper permeation into a neighborhood of the surface and, in addition, it is liked that the process is of advantage to industry. However, hitherto known methods have had problems in these points. That is, in the method wherein a water-absorbent resin being dispersed in a solvent and undergoing a crosslinking reaction, a large amount of solvent is required and so, its recovery process is of disadvantage to industry. Especially, in a case being carried out in a hydrophobic organic solvent, distribution of a crosslinking agent on the surface of a water-absorbent resin is apt to become ununiform, so that the crossliking of surface becomes ununiform. In the other hand, the method wherein a water-absorbent resin is mixed with a liquid component containing a crosslonking agent and treated with heat, is of great advantage to industry, and however, in a case of that particle diameter of a water-absorbent resin is small or distribution of particle diameter is broad, there was found a case that, though being affected on a treatment solution mixing with the water-absorbent resin powder, the powder meets together making a large lump (a fish-eye) and so, it is rather hard to crosslink uniformly the surface. Futhermore, though by doing these treatments such properties as water absorption rate and suction force are somewhat improved, but the improvement is still insufficient and, in particular, elution of a water-soluble component could not be prevented. Thus, has not yet found a method sufficiently satisfied in point of that various kinds of properties of a water-absorbent resin are improved maintaining good balance of properties.

BRIEF SUMMARY OF THE INVENTION

Under these circumstances, the first object of this invention is to provide a water-absorbent resin, wherein the average particle diameter being in a specially defined range, the particle diameter distribution being narrow, the surface being uniformly improved, and in particular, to provide a water-absorbent resin wherein the water absorption capacity, water absorption rate, suction force, and gel strength being superior and an amount of a water-soluble component being small, and a process for producing this resin.

The second object of this invention is to provide a water-absorbent resin wherein the shape being angle-lacking, non-sphere, new and novel type, and the surface being uniformly improved in quality, and a process for producing this resin.

These objects are attained by crosslinking the surface of a water-absorbent polymer powder wherein the average particle diameter being in 100~600 μm, the particle diameter distribution being 0.35 or less of a logarithmic standard deviation value, $\sigma_\zeta$, or a water-absorbent polymer powder wherein a ratio between average length and average breadth being 1.5~20 and showing an angle-lacking, non-sphere shape.

As methods to obtain a water-absorbent polymer powder having the above-described average particle diameter and particle diameter distribution in this invention, although there have been shown, as examples, a method of an aqueous solution polymerization followed by pulverization and classification to fit in a range of the above-described average particle diameter and particle diameter distribution and a method of reverse-phase suspended polymerization under specified conditions, in order to obtain in a good yield a water-absorbent polymer powder having the above-described average particle diameter and particle diameter distribution and a new, novel shape, the most preferable method is to take a system where, when a reverse-phase suspention polymerization is carried out by using a radical polymerization initiator under conditions that a water-soluble ethylenically unsaturated monomer or its aqueous solution is suspended and dispersed in a hydrophobic organic solvent, the viscosity of an aqueous solution of the water-soluble ethylenically unsaturated monomer determined by a Brookfield rotatory viscosinmeter is adjusted in a value of 15 cps or more and a sucrose fatty acid ester and/or polyglycerol fatty acid ester are used as a dispersing agent.

In performing the above-described production process, if the viscosity defined as above is adjusted in a range of 15~5,000 cps, is obtained in good yields a polymer powder having an average diameter of 100~600 μm and an index (a logarithmic standard deviation) of 0.35 or less which represents particle diameter distribution.

Furthermore, in performing the above-described production process, if the viscosity defined as above is adjusted in a range of 5,000~1,000,000 cps and, as a dispersing agent, a sucrose fatty acid esters is only used, is obtained in good yields a polymer powder wherein the ratio between length and breadth being in a range of 1.5~20 and the shape being non-sphere without angle.

As examples of a water-soluble ethylenically unsaturated monomer constituting a water-absorbent resin in the present invention, are cited monomers of anionic character such as acrylic acid, methacrylic acid, crotonic acid, maleic acid and its anhydride, fumaric acid, itaconic acid, and 2-(meth)acryloylethanesulfonic acid, and 2-(meth)acryloylpropanesulfonic acid, and 2-(meth)acrylamido-2-methylpropanesulfonic acid, vinylsulfonic acid, styrenesulfonic acid and the like and their salts; monomers containing nonionic hydrophilic substituent such as (meth)acrylamide, N-substituted (meth)acrylamides, 2-hydroxyethyl (meth)acrylate, 2-hydroxypropyl (meth) acrylate, methoxypolyethylene glycol (meth)acrylate, polyethylene glycol (meth)acrylate and the like; monomers of cationic character such as N,N'-dimethylaminoethyl (meth)acrylate, N,N'-diethylaminoethyl (meth)acrylate, N,N'-diethylaminopropyl (meth)acrylate, N,N'-dimethylaminopropyl (meth)acrylamide, and the like and their quartary salts. These compounds can be used as alone or mixture of two or more compounds. Preferable are a kind of compound or a mixture of two or more compounds chosen from the following three groups of compounds: (meth)acrylic acid, 2-(meth)acryloylethanesulfonic acid, 2-(meth)acrylamido-2-methylpropanesulfonic acid, and their salts; and N,N'-dimethylaminoethyl (meth)acrylate and their quartary salts; and methoxypolyethylene glycol (meth)acrylate and (meth)acrylamide. Although the monomer concentration in an aqueous monomer solution is generally variable in a wide range, the preferred range is from 20 weight % up to saturation.

The water-absorbent polymer powder used for the present invention comprises a self-crosslinking type prepared in absent of a crosslinking agent and a type co-polymerized during polymerization with a small amount of crosslinking agent, which has polymerizable unsaturated groups or reactive functional groups. As examples of the crosslinking agents are cited N,N'-methylene-bis(meth)acrylamide, N-methylol(meth)acrylamide, ethylene glycol (meth)acrylate, polyethylene glycol (meth)acrylate, propylene glycol (meth)acrylate, polypropylene glycol (meth)acrylate, glycerol tri(meth)acrylate, glycerol mono(meth)acrylate, polyfunctional metal salts of (meth) acrylic acid, trimethylolpropane tri(meth)acrylate, triallylamine, triallyl cyanulate, triallyl isocyanulate, triallyl phosphate, glycidyl (meth)acrylate. As examples of agents having reactive functional groups for example, in a case that a monomer has a carboxyl and/or carboxylate group, polyhydric alcohol derivatives such as ethylene glyol, diethylene glycol, triethylene glycol, tetraethylene glycol, polyethylene glycol, glycerol, polyglycerol, propylene glycol, diethanolamine, triethanolamine, polyoxypropylene, oxyethyleneoxypropylene block co-polymer, pentaerythritol, and sorbitol; polyglycidyl derivatives such as ethylene glycol diglycidyl ether, polyethylene glycol diglycidyl ether, glycerol polyglycidyl ether, diglycerol polyglycidyl ether, polyglycerol polyglycidyl ether, sorbitol polyglycidyl ether, pentaerythritol polyglycidyl ether, propylene glycol diglycidyl ether, and polypropylene glycol diglycidyl ether; aziridine derivatives and related compounds such as 2,2-bishydroxymethylbutanol-tris [3-(1-aziridinyl) propionate]. 1, 6-hexamethylene-diethylene urea, and diphenylmethane-bis-4,4'-N,N'-diethylene urea; haloepoxyl compounds such as epichlorohydrin and α-methylchlorohydrin; polyaldehydes such as glutar aldehyde and glyoxal; poly amine derivatives such as ethylene diamine, diethylene triamine, triethylene tetramine, tetraethylene pentamine, pentaethylene hexamine, and polyethylene hexamine; polyisocyanates such as 2,4-toluylenediisocyanate and hexamethylenediisocyanate; polyvalent metal salts such as aluminium chloride, magnesium chloride, calcium chloride, aluminium sulfate, magnesium sulfate, and calcium sulfate. Subject to consideration upon reactivity, these crosslinking agents can be used as a mixture of more than two, but it is usually preferable to use a crosslinking agent having polymerizable unsaturated groups. An amount of use of these agents is in general about 0.001~1.0 mol. for a water-soluble ethylenically unsaturated monomer.

The most preferable way of obtaining the polymer profitable for the present invention is that the viscosity of an aqueous solution of water-soluble ethylenically unsaturated monomer is adjusted at a value of 15 cps or more when determined with a Brookfield rotatory viscometer (25° C., 0.6 rpm)(this sort of viscosity is hereinafter referred to as, simply, viscosity) and that the reverse-phase suspension polymerization is performed using a sucrose fatty acid ester and/or a polyglycerol fatty acid ester as a dispersing agent. If the viscosity being below 15 cps, the particle obtained is small in average particle diameter and broad in distribution of particle diameter.

In a method of the present invention wherein a previously-described, specially defined dispersing agent being used, the viscosity of an aqueous solution of water-soluble ethylenically unsaturated monomer being adjusted in a range of 15~5,000 cps, a water-absorbent polymer of sphere shape being suitable for use in the present invention and having an average particle diameter in a range of 100~600 μm depending upon viscosity and very narrow distribution of particle diameter can be obtained. Generally under the same condition, the higher the viscosity of an aqueous solution of a monomer becomes, the larger an average particle diameter of the resin obtained becomes, and polymer of various average particle diameters can be obtained with such a simple procedure as an adjustment of viscosity.

Although a preferable average particle diameter of a water-absorbent resin obtained is different depending upon a use, for instance, in a case being used as sanitary materials, the average particle diameter is usually in a range of 100~600 μm, more preferably about 150~400 μm. The particle of this kind is obtainable when the viscosity of an aqueous solution being adjusted in a range of 15~5,000 cps, more preferably 20~3,000 cps. In addition, a water-absorbent polymer obtained according to this method shows very narrow distribution of particle diameter.

For instance, when particle distribution is plotted in a logarithmic probability paper, a value of logarithmic standard deviation ($\sigma_z$), which is an index showing uniformity of a particle, is 0.35 or less, in a more preferable case 0.30 or less, that is narrow particle distribution not yet obtained by any previous method.

In the other side, when the viscosity of an aqueous solution of water-soluble ethylenically unsaturated monomer is adjusted in a range of 5,000~1,000,000 cps, although dependent upon stirring condition, the particles obtained shows that the ratio between average length and average breadth for particles as defined as below-described is in a range of 1.5~20, and an angle-lacking and non-sphere, so to speak, Vienna sausage-like shape. This polymer has length of 100~10000 μm, more preferably 1000~10000 μm and breadth of 10~2000 μm, more preferably 100~2000 μm, and a ratio between average length and average breadth being in a range of 1.5~20, so that it is easy in handling and treating in point of that it is hard for this polymer to fall off from basis materials, and the range of the combination with different basis materials is spread. The diameters to represent a shape of water-absorbent polymer are defined as follows.

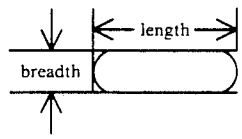

Although being in a range of 5,000 cps or more, when the viscosity is in a range of 5,000~20,000 cps, a non-sphere polymer and a sphere polymer are obtained as a mixture and, when the viscosity is higher than 20,000 cps, a non-sphere polymer is only obtained. Furthermore, when the viscosity is higher than 1,000,000 cps, there is sometimes accompanied by difficulty when an aqueous solution of monomer being supplied for a reaction vessel.

As the thickner used for adjsting viscosity as described above, are cited hydroxyethylcellulose, hydroxypropylcellulose, methylcellulose, carboxymethylcellulose, polyethylene glycol, polyacrylamide, polyethyleneimine, polyacrylic acid, partially neutralized polyacrylic acid, crosslinked polyacrylic acid, partially neutralized, crosslinked polyacrylic acid, dextrin, and sodium arginate so on. Preferable are hydroxyethylcellulose, polyacrylamide, polyacrylic acid, partially neutralized polyacrylic acid, crosslinked polyacrylic acid, partially neutralized, crosslinked polyacrylic acid. Very specially preferred for a water absorbent-resin having a new shape is hydroxyethylcellulose. For use of a water-soluble, partially neutralized polyacrylic acid, the viscosity of its 5% aqueous solution is preferred when it is 30 cps or more. For use of a water-insoluble, crosslinked product, is preferred the one whose particle diameter is about 30 μm or less and powder-like.

To thicken an aqueous solution to a designated viscosity by using these thickener, it is preferred that the thickener is generally used in a range of 0.05~20 weight % to a monomer, although the percentage is variable with the kind and concentration of a monomer and the kind and molecular weight of a thickener.

In the other side dispersing agents used in this case are sucrose fatty acid esters and/or polyglycerol fatty acid esters. As the former sucrose fatty acid esters, are cited mono-, di-, and triesters derived from sucrose with more than one aliphatic acid chosen from stearic acid, palmitic acid, lauric acid, and oleic acid. As the latter polyglycerol fatty acid esters, are cited mono-, di-, and triesters derived from polyglycerin of condensation degree 10 or less with, at least, one aliphatic acid chosen from stearic acid, palmitic acid, lauric acid, oleic acid, and ricinolic acid. Among all these nonionic surface active agents, most preferable are those indicating HLB of 2~6. The amount of a dispersing agent for use is generally 0.05~10 weight %, more preferably 0.5~5 weight % against the amount of a water-soluble ethylenically unsaturated monomer. To obtain the water-absorbent polymer having a new non-sphere shape without angle, that is one of the polymers suitable for use in the present invention, the sucrose fatty acid esters can be only used and, if other kinds of dispersing agents are used, this novel type of resin is not obtained.

As an inert hydrophobic organic solvent used for the present invention are cited, for example, aliphatic hydrocarbons such as n-pentane, n-hexane, n-heptane, and n-octane; cycloaliphatic hydrocarbons such as cyclohexane, cyclooctane, methylcyclohexane, decaline, and their derivatives; aromatic hydrocarbons such as benzene, ethylbenzene, toluene, xylene, and their substituted derivatives; and halogenated hydrocarbons such as chlorobenzene, bromobenzene, carbon tetrachloride, and 1,2-dichloroethane. These agents can be used as alone or a mixture of two kinds or more. Specially preferable are n-hexane, n-heptane, cyclohexane, methylcyclohexane, toluene, xylene, and carbon tetrachloride.

The ratio of an organic solvent to a water-soluble ethylenically unsaturated monomer is generally suitable as 1:1~5:1 from standpoints of steady dispersion and removal of heat generated during polymerization and temperature controll.

As an initiator for radical polymerization in the present invention, any kind of conventional agent can be used without limitation, but particularly, water-soluble ones are preferred. More concretely, for example, persulfates such as potassium persulfate, sodium persulfate, and ammonium persulfate; hydroperoxides such as hydrogen peroxide, t-butyl hydroperoxide, and cumene hydroperoxide; azo compounds such as 2,2'-azo-bis-2-amidinopropane dihydrochloride etc. are cited. These polymerization initiators can be used as a mixture of more than two agents. Furthermore, a redox type initiator prepared by combination of these polymerization initiators and reducing agents such as sulfite, L-ascorbic acid, and ferric salts may also be used.

In the case where above-described reverse-phase suspension polymerization is performed to obtain a water-absorbent polymer used for the present invention, if it is followed by a drying process, a water-absorbent polymer obtained can be taken out as a bead-like or Vienna sausage-like particle. As this drying process, there are methods wherein water is distilled off as an azeotropic mixture with a hydrophobic organic solvent used in polymerization and wherein filtration of a water-containing gel followed by drying with conventional drying apparatus due to heated wind, reduced pressure, or fluid bed is carried out.

To obtain a polymer powder usable in this invention, not only the above-described reverse-phase suspension polymerization, but also an usable condition is that, when a water-containing gel obtained from an aqueous solution polymerization known in public is dried, pulverized, and classified, the average particle diameter is adjusted in a range of 100~600 μm and the particle diameter distribution is adjusted at a value of 0.35 or less of $\sigma_\zeta$.

This invention is attained with uniform quality improvment of a polymer surface by means of surface-crosslinking in a previously known method where the polymer having an average particle diameter in a specially defined range, a narrow distribution of particle diameters, and a sausage shape are obtained according to the above-described method.

A more preferable method is that a polymer powder obtained by drying up to less than 10 weight % of water content is mixed with 0.005~20 weight % of a crosslinking agent (against the polymer powder) having a reactive group of two or more in its molecule for a functional group in the powder, a reaction is carried out with heating, and said polymer powder is crosslinked in a neighbor of the surface. When the crosslinking agent and the polymer powder being mixed, it is permitted to contain water and a hydrophiric organic solvent.

When this surface-crosslinking treatment being performed, if the treatment condition is chosen from a specially defined ones, the treatment effect becomes superior and an advantage of this process increases. That is, a polymer powder of water content of less than 10 weight % is mixed with a treatment solution composed of 0.005~20 weight % (more preferable 0.005~5 weight %) of a crosslinking agent to the polymer powder, 0.1~5 weight % of water, and 0.01~6 weight % of hydrophilic organic solvent, and thereby, the surface and its neighborhood of polymer power being crosslinked.

When the polymer powder having been obtained from the previously-described procedure, having an average particle diameter in the specially defined range, and showing narrow distribution of particle diameter is mixed with a treatment solution containing a crosslinking agent, any fish eye is not formed, the treatment solution is uniformly dispersed on the surface of the polymer powder, and appropriately permeated in a neighborhood of the polymer powder surface, and as a result, the crosslinking is performed uniformly and with good efficiency. Thus, is obtained a water-absorbent resin wherein water-absorption capacity being high, water-absorption rate and suction force being superior, elution of a water-soluble composition from the resin being small in amount, and as a sanitary material, being very suitable.

In the above described crosslinking process for producing a water-absorbent resin in this invention it is first required to maintain water content of the polymer at a value less than 10%, more preferably less than 7% by the similar process as the above-described one, which was obtained with reverse-phase suspension polymerization. In a case of water content 10% or more, when a crosslinking agent or the treatment solution containing this is mixed, in addition to that the mixing character is inferior, the crosslinking agent sometimes super-permeates an inside of the resin, so that a water-absorbent resin obtained sometimes has small water-absorption capacity.

As a crosslinking agent, which is able to use in this invention, although unlimited as far as it is a compound having two or more of a functional group reactive with functional groups existing in the polymer, are preferred hydrophilic, more preferred water-soluble compounds. For examples, in a case that the polymer has a carboxyl and/or carboxylate group as a functional group, are cited polyhydric alcohols such as ethylene glycol, diethylene glycol, triethylene glycol, tetraethylene glycol, polyethylene glycol, glycerol, polyglycerol, propylene glycol, diethanolamine, triethanolamine, polyoxypropylene, oxyethyleneoxypropylene block copolymer, pentaerythritol, and sorbitol; polyglycidyl compounds such as ethylene glycol diglycidyl ether, polyethylene glycol diglycidyl ether, glycerol polyglycidyl ether, diglycerol polyglycidyl ether, polyglycerol polyglycidyl ether, sorbitol polyglycidyl ether, pentaerythritol polyglycidyl ether, propylene glycol diglycidyl ether, and polypropylene glycol diglycidyl ether; polyaziridine derivatives such as 2,2'-bishydroxymethylbutanol-tris[3-(1-aziridinyl) propionate], 1,6-hexamethylenediethylenyl urea, and diphenylmethane-bis-4,4'-N,N'-diethylenyl urea; haloepoxy compounds such as epichlorohydrine and α-methylchlorohydrine; polyaldehydes such as glutal aldehyde and glyoxal; polyamine derivatives such as ethylenediamine, diethylenetriamine, triethylenetetramine, tetraethylenepentamine, pentaethylenehexamine, and polyethyleneimine; polyisocyanates such as 2,4-toluylenediisocyanate and hexamethylenediisocyanate; polyvalent metal salts such as aluminium chloride, magnesium chloride, calcium chloride, aluminium sulfate, magnesium sulfate, and calcium sulfate. Particularly preferable are polyhydric alcohols, polyglycidyl compounds, polyamine derivatives, and polyvalent metal salts. The amount of use of these hydrophilic crosslinking agent is 0.005~20 weight % against a polymer powder, preferable 0.005~5 weight %, more preferable 0.01~1 weight %. In a case that this amount is less than 0.005 weight %, an effect of surface treatment does not appear and also, even if it is used in amount more than 20 weight %, there are some cases where an effect correspond to amount of use of crosslinking agent does not appear and the water absorption capacity remarkably decreases.

In the present invention, if a crosslinking agent is mixed with polymer powder, it is preferable for increase of the treatment effect that the above-described treatment solution containing water and an organic solvent is used. In this case, the amount of water composing a treatment solution is 0.1~5 weight % against a polymer powder. If this amount is less than 0.1 weight %, a crosslinking agent does not easily permeate a neighborhood of the polymer powder surface, so that a crosslinking surface layer does not properly form. Also, there are some cases where if it exeeds 5 weight %, the agent permeats in exess, so that the water absorption capacity decreases.

As a hydrophilic organic solvent composing of the treatment solution, it is not particularly limited as far as it can dissolve a crosslinking agent and does not affect the performance of a water-absorbent resin. As such, for examples, are cited lower alcohols such as methanol, ethanol, n-propanol, isopropanol, and n-butanol; ketones such as acetone and methylethylketone; ethers such as dioxane and tetrahydrofuran; amides such as N-N'-dimethylformamide; sulfoxides such as dimethylsulfoxide. The amount of use of a hydrophilic organic solvent is 0.1~6 weight %. In a case that the amount of use of a hydrophilic organic solvent is less than 0.1 weight %, mixing of a polymer with the treatment solution becomes nonuniform and also; if the amount exceeds 6 weight %, an effect corresponding to the amount of use can not be obtained and only expense increases, so that it is not industrially favorable. Although dependent upon the kind of hydrophilic organic solvents, it is generally preferable to use 0.3~4 weight % against a water-absorbent resin.

As a method to mix a treatment solution containing a crosslinking agent with a polymer powder in this invention, it is general to spray or drop and mix the treatment solution for a polymer powder. As a mixer used for mixing, although is preferred the one having a big mixing power to mix uniformly, conventional mixer and kneader can be used. For examples, are cited a cylinder mixer, a double cone mixer, a V-type mixer, a ribbon mixer, a screw mixer, a fluidized mixer, a rotating-disc type mixer, an air mixer, a double-arm type kneader, an internal mixer, a muller kneader, a roll mixer, and a screw extruder etc. To warm up a composition obtained with mixing a treatment solution containing these crosslinking agents with a polymer powder, a conventional dryer or heating furnace can be used.

For examples, are cited a gutter stirring dryer, a rotating dryer, a disc dryer, a kneading dryer, a fluidized dryer, an air dryer, an infrared light dryer, and an dielectrically heating dryer. Temperature for heating treatment is in a range of 40°~250° C., more preferable 80°~200° C.

The water-absorbent resin obtained from the production process in this invention has an average particle diameter in a specially defined range and a narrow distribution of particle diameter and also, has high water absorption capacity and a superior water absorption rate and suction force. In addition, since a water-soluble component existing in an inside of the resin is only eluted in a very small amount from a surface of the resin, the resin is very superior, in particular, in a dispersion character of liquid and in safety when being used as sanitary materials. This kind of water-absorbent resin, as mentioned above, is possible to be produced in the best yield and with high efficiency in the case of that an aqueous solution of water-soluble ethylenically unsaturated monomer, of which viscosity is adjusted at a specially defined value by using a thickener, undergoes a reverse-phase suspension polymerization using a sucrose fatty acid ester and/or polyglycerol fatty acid ester as a dispersing agent and a polymer obtained is dried and, mixed and warmed with a treatment solution containing a crosslinking agent of a specially defined composition.

Also, such a method involving treatment of a surface part like this case does not require a large amount of organic solvent, so that it is of advantage to economy and industry and a superior water-absorbent resin being of high safety as a sanitary material and various kinds of water-holding materials became obtainable in a method very useful for producing.

DETAILED DESCRIPTION OF THE INVENTION

Examples

Figure 1:
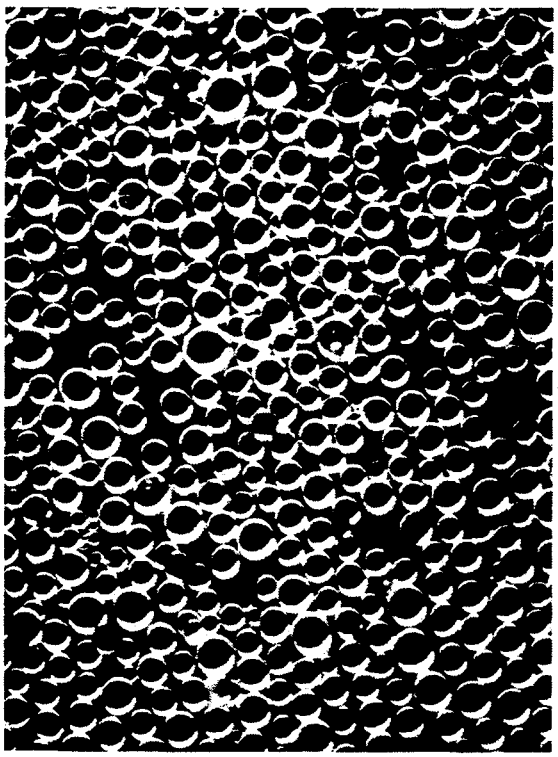
FIG. 1 is an optical microphotograph to represent a particle structure of the water-absorbent resin of a sphere shape (A16) obtained from example 6.
Figure 2:
FIG. 2 is an optical microphotograph to represent a particle structure of the water-absorbent resin of a vienna sausage shape (A18) obtained from example 8.
Figure 3:
FIG. 3 is an optical microphotograph to represent a particle structure of the water-absorbent resin (B12) obtained from example for comparison 3.

Although the present invention is explained in detail with the examples described below, a range of the present invention is not defined within the examples.

The water absorption performance of water-absorbent resin is determined according to the procedure shown below.

(1) Average Particle Diameter and Distribution of Particle Diameter

The resin powder is sifted and classified by using JIS standard sieves (20, 32, 48, 60, 100, 145, 200, and 350 mesh) and then, the remaining percentage (R %) is plotted on a logarithmic probability paper. Average diameter is represented by a particle diameter corresponding to R for 50%.

The particle distribution is represented by using logarithmic standard deviation, $\sigma_\zeta$, as an index, which is derived from the following equation:

$$\sigma_\zeta = \frac{1}{2} \ln \frac{x_2}{x_1}$$

($x_1$ and $x_2$ are particle diameters wherein $R$ are equal to 84.1% and 15.9%, respectively.)

Here, it is meaned that, as the value of $\sigma_\zeta$ becomes smaller, the particle distribution becomes more uniform.

(2) Water Absorption Capacity

The water-absorbent resin, 0.2 g, is uniformly put into a tea bag-like bag (40 mm × 150 mm) made by a nonwoven fabric, and soaked in a 0.9 weight % aqueous solution of sodium chloride. The teabag-like bag is taken out after 10 minutes and 30 minutes, respectively, and stood for draining for a designated time. Then, the weight is determined and the water absorption capacity is calculated by the following equation. Further, when only the tea bag is being soaked, the weight obtained after water absorption is taken as a blank.

Water absorption capacity (g/g) = (weight of bag after absorption-blank)/(weight of water-absorption resin)

(3) Water Absorption Rate

To 20 ml of synthetic urine containing 1.9 weight % of urea, 0.8 weight % of sodium chloride, 0.1 weight % of calcium chloride, and 0.1 weight % of magnesium sulfate is added 1.0 g of a water-absorbent resin. The water absorption rate is defined with time passed until the water-absorbent resin absorbing the synthetic urine losts the flowing character of a swelling gel.

(4) Suction force

Water-absorbent resin, 1.0 g, is placed on a material containing synthetic urine, prepared by adding 20 ml of synthetic urine on a tissue paper of size 55 mm × 75 mm. After standing for 10 mm, a gel swelled is taken and weighed. The weight is defined as suction force of the resin from the tissue paper. At the same time, the presence of a fish-eye of the added water-absorbent resin was examined.

(5) Amount of Water-Soluble Component Eluted from Resin Surface

A disposable diaper for child composed of a nonwoven fabric, cotton-like pulp, a water-absorbent paper, and a waterproof film (having a weight of 72 g) is cut in half and 2.5 g of a polymer is uniformly scattered between the cotton-pulp and the water-absorbent paper and to this, 120 ml of the above-described synthetic urine is added, and the thus-prepared sample is stood for 16 hours at 37° C. After standing for 16 hours, the cotton-like pulp is only taken and a water-soluble component transferred from the pulp is extracted with 1,000 ml of pure water. This extract solution is filtered and a polymer component contained in this filtered solution is measured by using an acid-base titration method and thus, a total amount of a water-soluble component eluted is determined against the amount of water-absorbent resin as weight %.

EXAMPLE 1

In a four-necked separable 2 L flask equipped with a stirrer, a reflux condenser, a thermometer, an inlet tube for nitrogen gas, and a dropping funnel was placed 1,000 ml of cyclohexane and dissolved 4.0 g of a sucrose fatty acid ester (DN-ESTER F-50, HLB=6, a product from DAIICHI KOGYO SEIYAKU Co., LTD.) and nitrogen gas was introduced into this solution to remove oxygen dissolved. In another flask containing a solution of 84.6 g of sodium acrylate, 21.6 g of acrylic acid, and 0.016 g of N,N'-methylene-bisacrylamide in 197 g of ion-exchanged water was dissolved 0.53 g of hydroxyethylcellulose (HEC-DAISERU EP-850, a product from DAISERU CHEMICAL Co., LTD.) and was prepared a monomer solution adjusted at a monomer concentration of 35 weight % and viscosity of 40 cps. To this monomer solution was dissolved 0.15 g of potassium persulfate and then, nitrogen gas was introduced to remove oxygen dissolved in this aqueous solution.

Next, to the above separable flask solution was added the aqueous monomer solution in the latter flask and the mixture obtained was dispersed with stirring at 230 rpm. Then, polymerization reaction was initiated by raising bath temperature to 60° C. and completed by maintaining this temperature for 2 hours. After polymerization, the reaction mixture was treated by an azeotropic distillation with cyclohexane to remove water in the water-containing gel, filtered, and dried at 80° C. under reduced pressure to obtain a polymer powder of sphere shape (A01). Water content for this polymer powder was 5.6%.

With 100 weight parts (weight parts are hereinafter referred to as parts) of the polymer powder (A01) was mixed by a paddle type mixer a treatment solution composed of 0.3 parts of diethylene glycol, 4 parts of water, and 0.5 parts of isopropanol. When mixing, any large lump is not formed and all the composition passed through a 20 mesh metal net (mesh of 840 μm) when tried. The composition obtained was treated with heat by a paddle type dryer at 180° C. for 1 hour to obtain a water-absorbent resin (A11). Results obtained from properties measurements for this resin are shown in table 1.

EXAMPLE 2

Except the use of 2.2 g of hydroxyethylcellulose (SP-600, a product from DAISERU CHEMICAL Co., LTD.), a polymerization reaction was carried out under the same conditions to those for example 1. Viscosity of the monomer aqueous solution was 800 cps and water content of a polymer powder of sphere shape (A02) was 6.8%. With 100 parts of the polymer powder (A02) was mixed by a paddle type mixer a treatment solution composed of 0.1 parts of ethylene glycol diglycidyl ether, 3 parts of water, and 6 parts of methanol. When passing is tried, all the composition passed through a 20 mesh metal net. The composition obtained was treated with heat by a paddle type dryer at 100° C. for 1 hour to obtain a water-absorbent resin (A12). Results obtained from properties measurements for this resin are shown in table 1.

EXAMPLE 3

Except the use of 3.5 g of hexaglycerol-condensed ricinolate (STEP RP-6, a product from KAO Co., LTD.), a polymerization reaction was carried out in the same way as in example 1 to obtain a polymer powder of sphere shape (A03), which showed water content of 6.3%. With 100 parts of the polymer powder (A03) was mixed by a V-type mixer a treatment solution composed of 0.08 parts of epichlorohydrin, 2 parts of water, and 4 parts of methanol. When tried, all the composition passed through a 20 mesh metal net and a lump is not observed which may be formed when mixing. The composion obtained was treated with heat by a paddle type dryer at 100° C. for 1 hour to obtain a water-absorbent resin (A13). Results obtained from properties measurements for this resin are shown in table 1.

EXAMPLE 4

In a four-necked separable 2 L flask equipped with a stirrer, a reflux condenser, a thermometer, an inlet tube for nitrogen gas, and a dropping funnel was placed 1,000 ml of cyclohexane and dissolved 4.0 g of a sucrose fatty acid ester ( DH-ESTER F-20, a product from DAIICHI KOGYO SEIYAKU Co., LTD. ), and nitrogen gas was introduced into this solution to expel oxygen dissolved. In another flask, 65.8 g of sodium acrylate, 21.6 g of acrylic acid, 0.076 g of polyethylene glycol diacylate ( n=14 ), and 15 g of sodium polyacrylate (AQUALIC OM-100, a product from NIPPON SHOKUBAI KAGAKU KOGYO Co., LTD., viscosity of 150 cps at 25° C. for a 5% aqueous solution) was dissolved in 250 g of ion-exchanged water to prepare an aqueous monomer solution of viscosity of 20 cps.

Next, into this solution, 0.12 g of sodium persulfate was dissolved and a reaction procedure was carried out in the same way as that for example 1 to obtain a polymer powder of sphere shape (A04), which showed water content of 4.8%.

With 100 parts of the polymer powder (A04) was mixed by a paddle type mixer a treatment solution composed of 1 part of glycerol, 5 parts of water, and 1 part of isopropanol. All the composition passed through a 20 mesh metal net and any lump is not formed at the mixing. Then, the composition obtained was treated with heat by a paddle type dryer at 180° C. for 1.5 hours to obtain a water-absorbent resin (A14). Results obtained from properties measurements for this resin are shown in table 1.

EXAMPLE 5

Except the use of sodium polyacrylate (AQUALIC FH, $2 \times 10^4$ cps at 25° C. for viscosity of 1% aqueous solution, a product from NIPPON SHOKUBAI KAGAKU KOGYO Co., LTD.) as a thickener, a reaction procedure was carried out in the same way as that for example 4 to obtain a polymer powder of sphere shape (A05), showing water content of 5.8%. The viscosity of an aqueous monomer solution was 27 cps. With 100 parts of the polymer powder (A05) was mixed by a ribbon type mixer a treatment solution composed of 0.05 parts of glycerol glycidyl ether, 4 parts of water, and 0.8 parts of ethanol. All the composition passed through a 20 mesh metal net and, when mixing, any lump did not form. The composition obtained was treated with heat in a fluidized bed dryer at 100° C. for 1 hour to obtain a water-absorbent resin (A15). Results obtained from properties measurements for this resin are shown in table 1.

EXAMPLE 6

Except that the amount of hydroxyethylcellulose (HEC-DAISERU EP-850, a product from DAISERU KAGAKU KOGYO Co., LTD.) in example 1 was changed into 1.6 g and the viscosity of aqueous monomer solution was adjusted at 2,000 cps. a polymerization reaction was carried out in the same way as that for example 1 to obtain 0.6 g of a water-absorbent polymer powder of all sphere shape (A06), which showed water content of 6.4%. In the same way as carried out for example 1, this polymer powder (A06) was treated with a surface crosslinking to obtain a water-absorbent resin (A16). Results obtained from properties measurements for this resin are shown in table 1.

EXAMPLE 7

Except that the amount of hydroxyethylcellulose (HEC-DAISERU SP-600, a product from DAISERU KAGAKU KOGYO Co., LTD.) was 0.3 g and the viscosity of aqueous monomer solution was adjusted at 17 cps, a polymerization reaction was carried out in the same way as that for example 2 to obtain a water-absorbent polymer powder of sphere shape (A07) which showed water content of 5.9%. In the same way as carried out for example 1, this polymer powder (A07) was treated with a surface crosslinking to obtain a water-absorbent resin (A17). Results obtained from properties measurements for this resin are shown in table 1.

EXAMPLE 8

In a four-necked separable 2 L flask equipped with a stirrer, a reflux condenser, a thermometer, an inlet tube for nitrogen gas, and a dropping funnel is placed 1,000 ml of cyclohexane and dissolved 4.0 g of a sucrose fatty acid ester (DK-ESTER F-50, a product from DAIICHI KOGYO SEIYAKU Co., LTD., HLP=6) and nitrogen gas was introduced into this solution to remove oxygen dissolved. In another flask containing a solution of 84.6 g of sodium acrylate, 21.6 g of acrylic acid, and 0.016 g of N,N'-methylene-bisacrylamide in 197 g of ion-exchanged water was dissolved 3.2 g of hydroxyethylcellulose (HEC-DAISERU EP-850, a product from DAISERU CHEMICAL Co., LTD.) and was prepared an aqueous monomer solution adjusted at a monomer concentration of 35 weight % and viscosity of 35,000 cps. To this aqueous monomer solution was dissolved 0.15 g of potassium persulfate and then, nitrogen gas was introduced to remove oxygen dissolving in this aqueous solution.

Next, to the above separable flask solution was added the aqueous monomer solution in the latter flask and the mixture obtained was dispersed with stirring at 230 rpm. Then, polymerization reaction was initiated by raising bath temperature to 60° C. and completed by maintaining this temperature for 2 hours. After polymerization completed, the reaction mixture was treated by an azeotropic distillation with cyclohexane to remove water in the water-containing gel, filtered, and dried at 80° C. under reduced pressure to obtain a polymer powder (A08), which had average length of 3,000 μm and average breadth of 550 μm and showed somewhat long and narrow shape of Vienna sausage type. Besides, any sphere particle did not exist.

This polymer powder (A08) was treated with surface crosslinking in the same way as that for example 1 to obtain a water-absorbent resin (A18). Results obtained from properties measurements for this resin are shown in table 1.

EXAMPLE 9

Except that the amount of a thickener, hydroxyethylcellu lose (EP-850 a product of DAISERU KAGAKU KOGYO Co., LTD.) was changed into 5.3 g, a polymerization reaction was carried out in the same way as that for example 8. Viscosity of the aqueous monomer solution was 240,000 cps. After the polymerization completed, treatment with an azeotropic dehydration followed by filtration and drying under reduced pressure gave a polymer powder (A09) having average length of 3500 μm and average breadth of 600 μm and showing a long and narrow shape of Vienna sausage type. Any sphere particle did not exist. This polymer powder (A09) was treated with surface crosslinking in the same way as that for example 2 to obtain a water-absorbent resin (A19). Results obtained from properties measurements for this resin are shown in table 1.

EXAMPLE 10

Into 329 g of ion-exchanged water was dissolved 141 g of sodium acrylate, 36.1 g of acrylic acid, and 0.118 g of N,N'-methylen-bisacrylamide and, a static aqueous solution polymerization was carried out at 55°~80° C. under a nitrogen atmosphere by using 0.68 g of ammonium persulfate and 0.025 g of sodium hydrogensulfite to obtain a gel-like water-containing polymer, which was dried at 180° C. with a heated wind dryer, pulverized with a hammer-type pulverizer, and sieved with a 28 and a 60 mesh metal nets. The portion, which passed the 28 mesh net but not the 60 mesh net, was taken as a pulverized polymer powder (A010). Treatment of this polymer powder (A010) by surface crosslinking performed in the same way as that for examle 1 gave a water-absorbent resin (A110). Results obtained from properties measurements for this resin are shown in table 1.

EXAMPLE FOR COMPARISON 1

Properties of the polymer powder (A01) obtained from example 1 were measured and summarized in table 1.

EXAMPLE FOR COMPARISON 2

Except that 3.5 g of sorbitane monostearate (REODOL SP-S10, a product from KAO Co., LTD.) was used as a dispersing agent instead of a sucrose fatty acid ester, a polymerization procedure was carried out in the same way as for example 1 to obtain a polymer powder for comparison (B01), which had water content of 6.2%. The polymer powder for comparison (B01) obtained was mixed with a liquid composition, which is the same as used for example 1, by a paddle type mixer. When mixing, were formed lumps in 8.6%, which did not pass through a 20 mesh metal net. The composition obtained was treated with heat at 180° C. for 1 hour by using a paddle dryer to obtain a water-absorbent resin for comparison (B11). Results obtained from properties measurements for this resin are shown in table 1.

EXAMPLE FOR COMPARISON 3

Except no addition of hydroxethylcellulose to a aqueous monomer solution, the same procedure as for example 1 was carried out to obtain a polymer powder (B02), which showed water content of 4.7%. At this time, viscosity of a aqueous monomer solution was 7 cps.

The polymer powder for comparison (B02) was mixed by a paddle type mixer with a liquid composition same as used in example 2. When mixing, were formed lumps in 8.2% which did not pass through a 20 mesh metal net. The composition obtained was treated with heat by a fluidized bed dryer at 100° C. for 1 hour to obtain a water-absorbent resin for comparison (B12). Results obtained from properties measurements for this resin are shown in table 1.

EXAMPLE FOR COMPARISON 4

Except that 4.0 g of tetraglycerol monostearate (POEMU J-4010, a product from RIKEN VITAMIN Co., LTD.) was used as a dispersing agent instead of a sucrose fatty acid ester used in example 1 and hydroxyethylcellulose was not added to the aqueous monomer solution, a procedure same as for example 1 was carried out to obtain a polymer powder (B03), which showed water content of 5.9%.

The polymer powder for comparison (B03) was mixed with a liquid composition, which is the same as used for example 1, by a paddle type mixer. When mixing, were formed lumps in 7.6% which did not pass through a 20 mesh metal net. The composition was treated with heat by a paddle dryer at 180° C. for 1 hour to obtain a water-absorbent resin for comparison (B13). Results obtained from properties measurements for this resin are shown in table 1.

EXAMPLE FOR COMPARISON 5

Properties measured for the polymer powder (A08) in example 8 are shown in table 1.

EXAMPLE FOR COMPARISON 6

In example 10, taking only a part passed through a 28 meth metal net, a polymer powder for comparison (B04) was obtained. Treatment of this polymer powder for comparison (B04) with surface-crosslinkage gave a water-absorbent resin for comparison (B14). Results obtained from properties measurements for this resin are shown in table 1.

TABLE 1

|  | Water-absorbent resin obtained | Average particle diameter (μm) | Particle diameter distribution $\sigma_\zeta$ | Amount of lump (%) | Water absorption capacity (g/g) 10 min. | Water absorption capacity (g/g) 30 min. | Water absorption rate (sec.) | Suction force (g) | Formation of fish-eye * | Water-soluble component eluted (%) |
|---|---|---|---|---|---|---|---|---|---|---|
| Example 1 | Water-absorbent resin (A11) | 400 | 0.16 | 0 | 59 | 65 | 21 | 18.0 | ⓒ | 0.15 |
| Example 2 | Water-absorbent resin (A12) | 500 | 0.11 | 0 | 54 | 60 | 33 | 17.9 | ⓒ | 0.08 |
| Example 3 | Water-absorbent resin (A13) | 300 | 0.15 | 0 | 57 | 63 | 28 | 18.8 | ⓒ | 0.12 |
| Example 4 | Water-absorbent resin (A14) | 350 | 0.18 | 0 | 60 | 67 | 22 | 18.7 | ⓒ | 0.07 |
| Example 5 | Water-absorbent resin (A15) | 350 | 0.17 | 0 | 59 | 65 | 19 | 18.2 | ⓒ | 0.05 |
| Example 6 | Water-absorbent resin (A16) | 550 | 0.19 | 0 | 47 | 64 | 42 | 17.6 | ⓒ | 0.09 |
| Example 7 | Water-absorbent resin (A17) | 150 | 0.24 | 0 | 52 | 60 | 18 | 18.2 | ⓒ | 0.13 |
| Example 8 | Water-absorbent resin (A18) | sausage-like shape |  | 0 | 36 | 51 | 52 | 16.2 | ⓒ | 1.21 |
| Example 9 | Water-absorbent | sausage-like shape |  | 0 | 38 | 54 | 49 | 16.3 | ⓒ | 0.99 |

TABLE 1-continued

|  | Water-absorbent resin obtained | Average particle diameter (μm) | Particle diameter distribution σ ζ | Amount of lump (%) | Water absorption capacity (g/g) 10 min. | 30 min. | Water absorption rate (sec.) | Suction force (g) | Formation of fish-eye * | Water-soluble component eluted (%) |
|---|---|---|---|---|---|---|---|---|---|---|
|  | resin (A19) |  |  |  |  |  |  |  |  |  |
| Example 10 | Water-absorbent resin (A110) | 280 | 0.16 | 0 | 43 | 62 | 38 | 17.8 | ⊚ | 1.82 |
| Example for comparison 1 | Polymer powder (A01) | 400 | 0.16 | — | 44 | 62 | 65 | 13.2 | ○ | 4.2 |
| Example for comparison 2 | Water-absorbent resin for comparison (B11) | 80 | 0.43 | 8.6 | 45 | 56 | 49 | 15.2 | Δ | 3.5 |
| Example for comparison 3 | Water-absorbent resin for comparison (B12) | 100 | 0.41 | 8.2 | 41 | 53 | 45 | 15.1 | Δ | 3.1 |
| Example for comparison 4 | Water-absorbent resin for comparison (B13) | 150 | 0.40 | 7.6 | 43 | 55 | 47 | 14.8 | Δ | 3.3 |
| Example for comparison 5 | Water-absorbent resin for comparison (A08) | sausage-like shape | | — | 28 | 50 | 97 | 11.3 | ○ | 4.9 |
| Example for comparison 6 | Water-absorbent resin for comparison (B14) | 230 | 0.58 | 3.5 | 38 | 59 | 47 | 15.0 | Δ | 5.1 |

(Note)
*⊚: No formation of fish-eye at all.
Δ: Some formation of fish-eye.
○: Nearly no formation of fish-eye.

We claim:

1. A water-absorbent resin comprising carboxyl-containing polymer particles having an average particle diameter of 100–600 μm and a particle diameter distribution logarithmic standard deviation of 0.35 or less, and wherein the surface of the polymer particles is selectively crosslinked.

2. A water-absorbent resin comprising carboxyl-containing polymer particles having an angle-free, non-spherical shape and a ratio between length and breadth in the range of 1.5–20, and wherein the surface of the polymer particles is selectively crosslinked.

3. A water-absorbent resin as claimed in claim 2, wherein the length of the particles is in the range of 100–10,000 μm and the breadth of the particles is in the range of 10–2,000 μm.

4. A water-absorbent resin comprising carboxyl-containing polymer particles having an average particle diameter of 100–600 μm and a particle diameter distribution logarithmic standard deviation of 0.35 or less, and wherein the surface of the polymer particles is further crosslinked.

5. A water-absorbent resin comprising carboxyl-containing particles having an angle-free, non-spherical shape and a ratio between length and breadth in the range of 1.5–20, and wherein the surface of the polymer particles is further crosslinked.

6. A water-absorbent resin as claimed in claim 5, wherein the length of the particles is in the range of 100–10,000 μm and the breadth of the particles is in the range of 10–2,000 μm.

* * * * *